(No Model.) 2 Sheets—Sheet 1.

G. WALKER & W. PEARCE.
MOLE TRAP.

No. 554,901. Patented Feb. 18, 1896.

Witnesses:
J. H. Thunning
Lillian D. Kelsey

George Walker
and William Pearce
By atty Earle Seymour
Inventors (No Model.) 2 Sheets—Sheet 2.
G. WALKER & W. PEARCE.
MOLE TRAP.
No. 554,901. Patented Feb. 18, 1896.
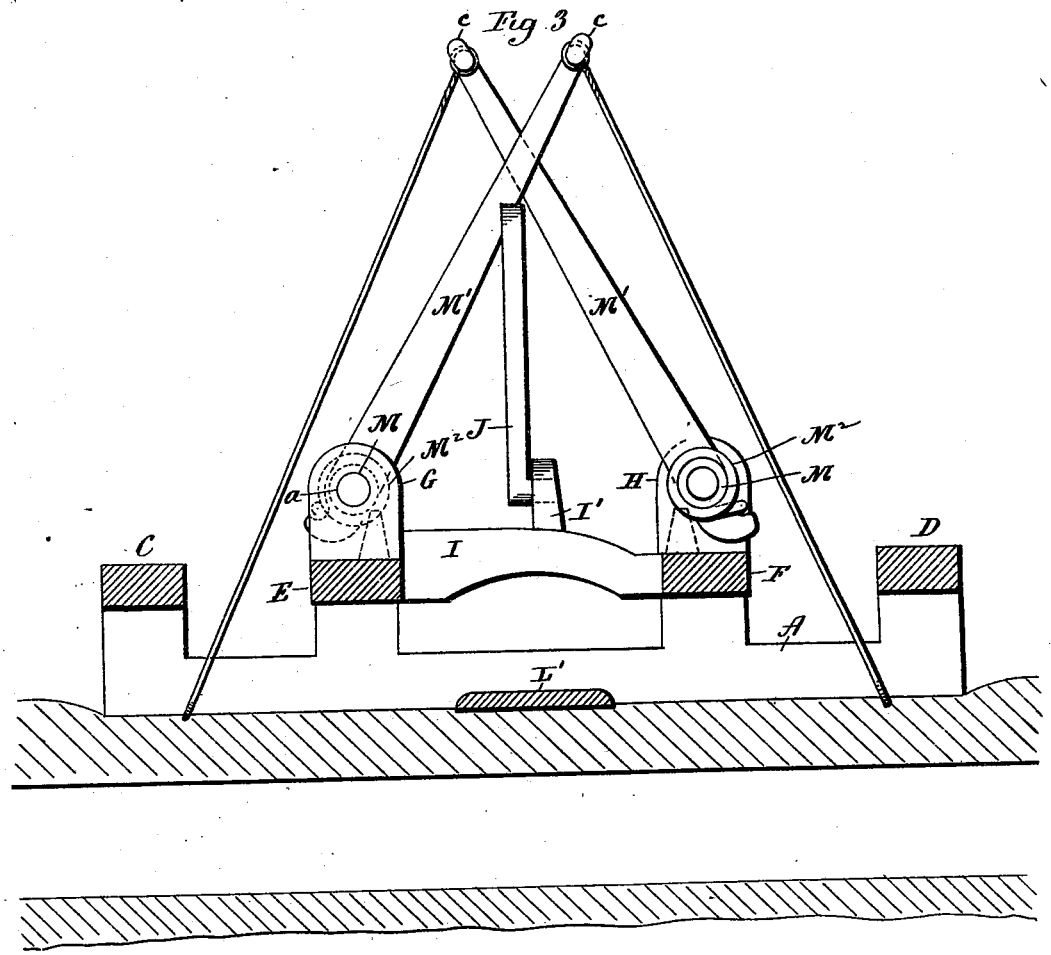
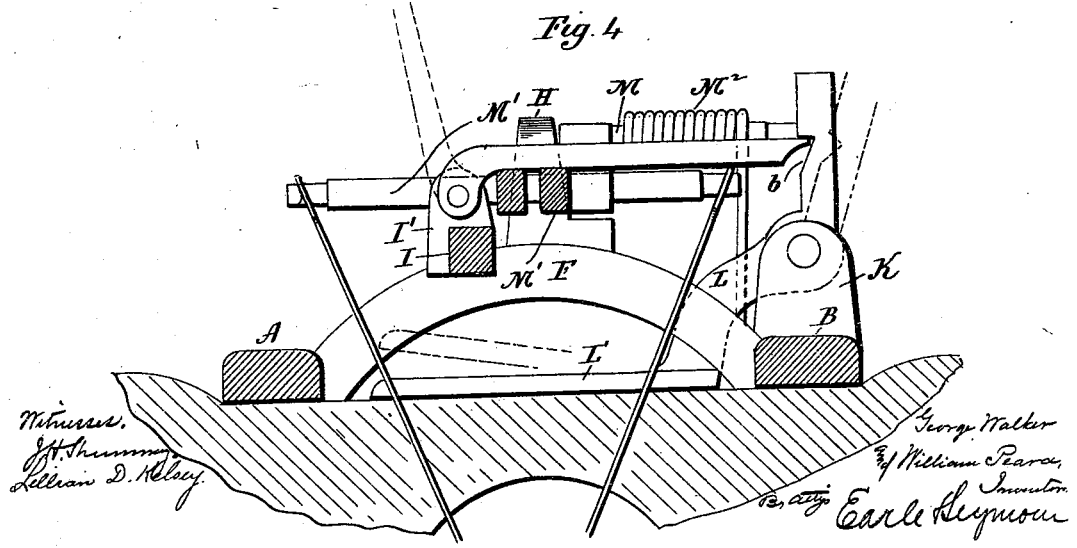

UNITED STATES PATENT OFFICE.

GEORGE WALKER AND WILLIAM PEARCE, OF PLANTSVILLE, CONNECTICUT, ASSIGNORS TO THE ATWATER MANUFACTURING COMPANY, OF SAME PLACE.

MOLE-TRAP.

SPECIFICATION forming part of Letters Patent No. 554,901, dated February 18, 1896.

Application filed October 7, 1895. Serial No. 564,975. (No model.)

*To all whom it may concern:*

Be it known that we, GEORGE WALKER and WILLIAM PEARCE, of Plantsville, in the county of Hartford and State of Connecticut, have invented a new Improvement in Mole-Traps; and we do hereby declare the following, when taken in connection with the accompanying drawings and the letters of reference marked thereon, to be a full, clear, and exact description of the same, and which said drawings constitute part of this specification, and represent, in—

Figure 1:
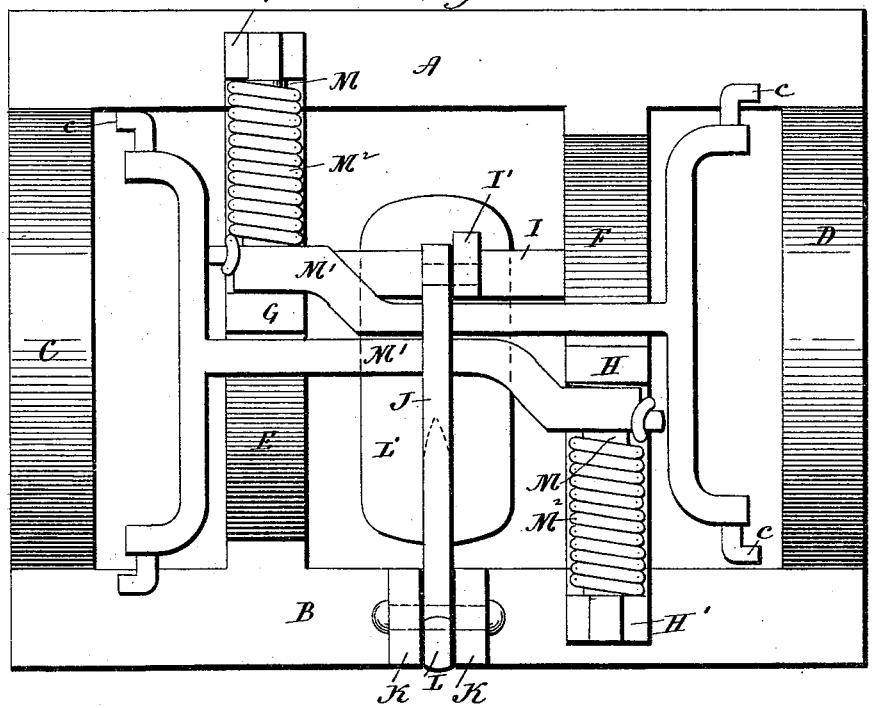
Figure 2:
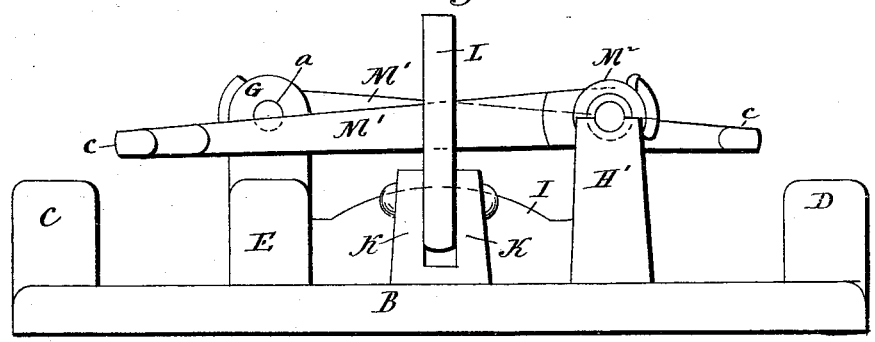

Figure 1, a top or plan view of a trap showing the position of the parts when set; Fig. 2, a side view of the same; Fig. 3, a sectional view illustrating the trap as sprung; Fig. 4, a transverse central section.

This invention relates to an improvement in mole-traps, and particularly such as are provided with spring-arms, to the ends of which wire loops are secured, which loops are inserted in the burrow and arranged so as to draw the mole upward when the arms are released by a trip operated by the mole passing through the burrow.

In many traps as heretofore constructed the mole is allowed to pass beyond the loop or the loop catch the mole by the head, and as the head of a mole is tapering the loop frequently slips off, thus allowing the mole to escape.

The object of this invention is to construct a trap which will catch the mole by the body and draw it upward between parts of the frame in such a way as to break its back; and it consists in the construction as hereinafter described, and particularly recited in the claims.

The frame of the trap consists of side bars A B, connected at the end bars by upwardly-bowed ends C D and at intermediate points by correspondingly-bowed bridges E F, which bridges are formed with upwardly-extending posts G H, in each of which is a perforation $a$. The bridges E F are connected by a bar I, from which extends a lug I', in which lug is pivoted a latch J. On opposite sides of the frame and in line with the posts G H are bearing-posts G' H', and on one side and in line with the lug I' are two ears K K, between which is pivoted the arm L of the tripping-plate L', which arm extends upward and is notched, as at $b$, to receive the end of the latch J.

Mounted in the posts G G' and H H' are rock-shafts M, from the inner ends of which forked arms M' extend to a position over the space between the bridges C E and the ends of the frame, and in the end of each branch of the fork is a lug $c$. Around the shafts M are coiled springs $M^2$, one end of each spring being secured to the frame and the other to the shaft, the tendency of said springs being to rock the shafts, so as to throw the forked end of the arms upward, as shown in Fig. 3.

The wires P, which form a part of the trap, are bent into U shape and formed with an eye $p$ in each end, which engage with the lugs $c$ on the ends of the arms M'.

To set the trap, the arms M' are depressed and the latch J turned down over them and engaged with the notch $b$ in the arm L of the tripping-plate, in which position the lower face of the plate stands substantially flush with the lower surface of the frame. A portion of the earth thrown up by the mole in making its burrow is depressed and the tripping-plate L' placed over that depression, and so that the ends of the frame and the bridges extend transversely across the burrow. The wires P are inserted into the burrow through the spaces between the bridges and the ends of the frame and connected to the lugs C on the ends of the arms M'. A mole passing through the burrow from either direction will raise the earth depressed beneath the tripping-plate, and hence raise the tripping-plate L', which throws the upper end of the arm out of engagement with the latch J, thus releasing the arms M, which, under the action of the springs $M^2$, will be thrown upward, as shown in Fig. 3, drawing the wires P up with them, the relation of the wires to the tripping-plate being such that when the mole is in position to raise that plate one of the loops will stand beneath its body and in rear of its forward legs, and so that as the loop is drawn upward it will pull the mole upward between one of the bridges and the adjustable end of the frame, so as to invariably break its back.

The trap as thus constructed is formed in few parts, which are readily cast, and the paddle is cast complete with handle and flanges, and, as before stated, is of such form that the wire is held in position thereon, and from which it is readily detached.

We are aware that mole-traps provided with spring-arms to the outer ends of which wire loops are attached have been used, and therefore do not wish to be understood as claiming broadly such as our invention; but What we do claim is—

1. The herein-described mole-trap, consisting of a frame having end bars and intermediate transverse bridges, spring-arms arranged upon the frame, and extending over the spaces between the bridges and the ends of the frame, a tripping-plate beneath said arms, a latch in engagement with said arms, and detachably connected to said tripping-plate, and wire loops connected to the ends of said arms and depending therefrom, substantially as described.

2. The herein-described mole-trap consisting of a frame, the sides of which are connected by upwardly-bowed ends and intermediate bridges, rock-shafts mounted in posts formed on opposite sides of the frame and on the bridges, arms extending from said shafts over the spaces between the bridges and the ends, springs on said shafts and connected at one end with the frame and the other with said shafts, a latch mounted in a bar connecting the said bridges, a tripping-plate pivoted to said frame and so as to stand beneath said latch, and formed with an upwardly-extending arm for engagement with the nose of the latch, and wire loops secured to the ends of the said arms and so as to depend therefrom, substantially as described.

In testimony whereof we have signed this specification in the presence of two subscribing witnesses.

GEORGE WALKER.
WILLIAM PEARCE.

Witnesses:
R. W. WALKER,
HAROLD A. PEPWORTH.